United States Patent [19]

Hornbaker et al.

[11] 4,289,862

[45] Sep. 15, 1981

[54] LIQUID PHOSPHAZENE COMPOSITIONS

[75] Inventors: Edwin D. Hornbaker; Hsueh M. Li, both of Baton Rouge, La.

[73] Assignee: Ethyl Corporation, Richmond, Va.

[21] Appl. No.: 167,748

[22] Filed: Jul. 14, 1980

[51] Int. Cl.³ .............................................. C08L 79/00
[52] U.S. Cl. ............................... 525/538; 260/30.6 R; 521/89; 521/96; 521/97
[58] Field of Search .......................................... 525/538

[56] References Cited

U.S. PATENT DOCUMENTS

| | | | |
|---|---|---|---|
| 3,676,311 | 7/1972 | Frank et al. | 204/159.14 |
| 3,888,799 | 6/1975 | Rose et al. | 525/538 |
| 3,945,966 | 3/1976 | Vicic et al. | 525/538 |
| 4,076,658 | 2/1978 | Dieck et al. | 260/18 R |
| 4,116,785 | 9/1978 | Cheng | 204/159.14 |
| 4,145,479 | 3/1979 | Adams et al. | 525/538 |

*Primary Examiner*—Wilbert J. Briggs, Sr.
*Attorney, Agent, or Firm*—Donald L. Johnson; John F. Sieberth

[57] ABSTRACT

Liquid, linear, crosslinkable phosphazene compositions and a process for their preparation are disclosed. These liquid compositions, prepared from normally solid polyphosphazene, contain the polyphosphazene in admixture with from about 1 to about 30 parts per hundred parts of polymer of a polythiol, a polyacrylate, a polymethacrylate or mixtures thereof such that the combination has a viscosity of less than 500,000 cps at 23° C. These compositions are easily handled and can be crosslinked at ambient temperatures.

15 Claims, No Drawings

LIQUID PHOSPHAZENE COMPOSITIONS

This invention relates to liquid, linear, crosslinkable phosphazene compositions and to a process for their preparation.

BACKGROUND

Various curable and foamable phosphazene polymers have been disclosed in the prior art. For example, U.S. Pat. No. 4,076,658 describes the preparation of poly(aryloxyphosphazene) copolymers and foams prepared therefrom. Because these copolymers are solid at ambient temperatures (i.e. 23° C.–27° C.), elevated temperatures are required in the fabrication of products therefrom, e.g. in the fabrication of foams. In an exemplary foaming procedure the milled, foamable mixture was precured for ten minutes at 230° F. under 2000 psi and then free expanded in a circulating air oven for 30 minutes at 300° F.

Because much energy is consumed in such conventional operations, a procedure for foaming and/or curing of substituted polyphosphazenes without large energy and investment requirements would be a welcomed contribution to the art.

THE INVENTION

It has been found that normally solid, substituted phosphazenes can be converted to liquid compositions in such a way as to render those compositions crosslinkable at ambient or slightly higher temperatures. Consequently, these liquid compositions can be utilized in molding operations without requiring the large energy and investment requirements needed in conventional polyphosphazene molding operations such as those referred to above.

Still other advantages accrue from the use of the liquid phosphazene compositions of this invention. For example because they are liquids they can be easily admixed with other ingredients (such as initiators, promoters and activators) and cured to provide crosslinked materials, such as forms, elastomers and coatings. Moreover as liquids they fill molds easily at low pressures and are easily handled during foaming and curing. Due to the ease of processing made possible by this invention, the cost of fabricating foams or elastomers from these compositions is significantly reduced as compared to prior operations.

Thus, in accordance with the present invention there is provided, in combination, a normally solid or viscous linear, substituted, crosslinkable phosphazene polymer having a viscosity of greater than 500,000 centipoises (cps) at 23° C., the polymer containing crosslinkable unsaturation in some of the substituents attached to the phosphorus atoms of the polymer, in admixture with from about 1 to about 30 parts per hundred parts of polymer (php) of a polythiol, polyacrylate, polymethacrylate or mixtures thereof (preferably a di-, tri- or tetrafunctional thiol, acrylate or methacrylate) such that the combination has a viscosity of less than 500,000 cps at 23° C. In another embodiment, these compositions also contain up to about 25 php of an auxiliary viscosity depressing agent (preferably from about 5 to about 20 php). The auxiliary viscosity depressing agent can be used to enhance the fluidity or lower the viscosity of the liquid composition. That is, when the composition has a viscosity above the desired value, an appropriate amount of viscosity depressing agent may be added, thereby lowering the viscosity to the desired value.

Another facet of this invention involves a process for the preparation of a liquid, crosslinkable phosphazene combination which comprises, (i) admixing a normally solid or viscous linear, substituted, crosslinkable phosphazene polymer having a viscosity of greater than 500,000 cps at 23° C., said polymer containing crosslinkable unsaturation in some of the substituents attached to the phosphorus atoms of said polymer, with an inert, low boiling low molecular weight organic solvent in an amount such that the viscosity of the resulting solution is less than about 500,000 cps at 23° C., (ii) admixing said mixture with from about 1 to 30 php of a polythiol, polyacrylate, polymethacrylate or a mixture thereof, and then (iii) removing said solvent from said mixture, the resulting combination having a viscosity of less than 500,000 cps at 23° C. In a particularly preferred embodiment the viscosity of the polymer-solvent solution is less than 200,000 cps at 23° C.

Polythiols used in the practice of this invention can be characterized by the general formula $R(SH)_x$ where $x$ is at least 2, and is preferably 2, 3 or 4. While it is contemplated that polythiols wherein $x$ is greater than 4 can be successfully employed in the practice of this invention, the dithiols, trithiols, tetrathiols and mixtures thereof are preferred. Most preferred are the dithiols, trithiols and tetrathiols having relatively low volatilities as such substances exhibit little or none of the well known odor characteristics of the more volatile polythiols. Examples of these most preferred polythiols (or polyfunctional thiols) include ethylene glycol dimercaptoacetate; ethylene glycol dimercaptopropionate; the polyethyleneglycol dimercaptoacetates; polyethyleneglycol di(3-mercaptopropionate); trimethylolethane tri(3-mercaptopropionate); trimethylolpropane tri(3-mercaptopropionate); pentaerythritol tetra(3-mercaptopropionate) and 2,2'-dimercaptodiethyl ether. Exemplary of the less preferred, through useable, more volatile polythiols are ethanedithiol; n-butanedithiol; and n-hexanedithiol. The amount of polythiol used herein will usually vary according to such considerations as the degree of crosslinking desired, the viscosity of the crosslinkable composition, and the rate of crosslinking desired during curing and/or foaming, among others. This amount generally falls within the range of from about 1 to about 30 php. Preferably, the amount of polythiol incorporated with the combinations of this invention falls within the range of from about 5 to about 25 parts per hundred parts of polyphosphazene.

Polyacrylate and polymethacrylate curing agents used in this invention include, di-, tri- and tetraacrylates, di-, tri- and tetramethacrylates and mixtures thereof. Specific examples include ethylene diacrylate, ethylene dimethacrylate, trimethylolpropane triacrylate, trimethylolpropane trimethacrylate, and the like. The amount of polyacrylate and polymethacrylate used generally falls within the range of from about 1 to about 30 php and preferably from 2 to 25 php.

Not only do the curing agents used herein serve as crosslinking agents (i.e. coupling or bridging the substituted phosphazenes at the sites of ethylenic unsaturation thereon) but, in addition, they have the property of reducing the viscosity of normally solid phosphazenes. Thus they serve a dual function, i.e. as a curing agent and as a viscosity reducer. Further, by the simple expedient of introducing into the blend a suitable foaming or blowing agent they can be foamed at room temperature thereby obviating the necessity of applying heat, a shortcoming of the prior art.

In still another preferred embodiment, the substituted phosphazenes of this invention are admixed with up to about 25 php of an auxiliary viscosity depressing agent different from the polythiols, polyacrylates and polymethacrylate curing agents. These compounds further reduce the viscosity of the composition when used in conjunction with the curing agents therein. They are liquid (preferably having a viscosity of less than 20 cps as measured at 23° C.) and compatible with the liquid phosphazene compositions of this invention; i.e. the viscosity depressant is inert to the compositions described herein. Examples of viscosity depressants include liquid halo aromatic hydrocarbons; liquid trialkyl phosphates; the liquid aryl phosphates such as tricresyl phosphate and cresyl diphenyl phosphate; and liquid haloalkylphosphates. Other viscosity depressants can be found by the expedient of performing a test such as that set forth in Example 1 hereinbelow. Preferred viscosity depressants include tris(2-chloroethylphosphate), ortho-dichlorobenzene, monochlorobenzene and tri-n-butylphosphate.

The substituted phosphazenes used herein can be prepared by a variety of methods found in the literature; likewise, a large variety of substituents on the phosphonitrilic backbone have been disclosed. In addition to the patent noted above, U.S. Pat. Nos. 3,702,833; 3,853,794; British Pat. No. 1,523,771; and Allock in his book *Phosphorus-Nitrogen Compounds,* Academic Press (1972), disclose methods for the formation of linear, substantially completely substituted polyphosphazenes having unsaturation in some of the substituents attached to the phosphorus atoms of the polymers (preferably from about 8 percent to about 50 percent, on a mole per mole basis, of the substituents), and having a viscosity of greater than 500,000 cps at 23° C. These polymers usually have average degrees of polymerization of greater than 70, and can be as high as 200 or more. The degree of viscosity reduction of the substituted polymers will vary according to such factors as the kind and amount of the substituents, as well as the degree of polymerization of the polymers. Heavy substituents (i.e. those having a molecular weight of about 70 or more) tend to increase the viscosity of the polymer more than groups of lower molecular weight. Suitable substituents include —OR, —SR, —NHR and —NR$_2$ where R is an organic radical.

In practicing the process of this invention a normally solid or viscous linear, substituted, crosslinkable phosphazene polymer is first admixed with or made in an inert low boiling, low molecular weight organic solvent. Solvents which can be used are linear, cyclic and aromatic hydrocarbons and their chlorinated derivatives. Likewise, linear and cyclic ethers may also be used herein. Preferably, the solvent used has a boiling point falling within the range of from about 30° to about 100° C., most preferably between about 40° and about 80° C. Exemplary solvents include methylene chloride, chloroform, carbon tetrachloride, dichloroethane, tetrachloroethane, benzene, toluene and the like. Other solvents which may be used herein include tetrahydrofuran, dioxane and ethyl acetate.

Amounts of solvent admixed with the normally solid substituted phosphazene will vary according to such factors as the viscosity of the phosphazene. In a preferred aspect the viscosity of this admixture is less than 200,000 cps. Generally the amount of solvent used falls within the range of from about 10 to about 100 parts per 100 parts of polymer by weight (php), preferably from about 10 to about 50 php, based on the weight of the phosphazene polymer used. Admixing of the polymer with the solvent may be accomplished by means known to the art, that is by the use of agitation, and the order of addition is not critical. That is, the solvent may be added to the polymer, or conversely, the polymer may be added to the solvent; alternatively, the two may be added to the mixing vessel concurrently.

After the desired solution of phosphazene polymer and solvent has been obtained, a polythiol, polyacrylate, polymethacrylate or a mixture thereof is admixed with the solution. The amount of curing agent used preferably falls in the range from about 1 to about 30 php and most preferably from about 5 to about 25 php. In carrying out the process of this invention mixtures of the curing agents described herein may be used. Alternatively one particular species is mixed therewith, e.g. trimethylolethane tris(3-mercaptopropionate). It can be seen that the amount and kind of curing agent used will vary according to such considerations as the degree of crosslinking desired in the crosslinkable phosphazene polymer, the viscosity desired of the crosslinkable combination, and the like. Mixing is carried out by conventional means known to those skilled in the art and is preferably carried out at moderate temperatures, i.e. temperatures in the range of from about 20°–30° C. Mixing of the curing agent with the phosphazene-solvent solution is preferably carried out in such a way as to insure intimate contact between the curing agent and the substituted phosphazene polymer.

The solvent is then removed or separated from the phosphazene-solvent-curing agent admixture leaving a combination consisting essentially of a linear, substituted, crosslinkable phosphazene polymer and curing agent. Although various methods for effecting this separation may be employed, preferably the solvent is removed by distillation. After the solvent is removed the resulting combination is liquid at ambient temperatures, i.e. it has a viscosity of less than 500,000 cps at about 23° C. The liquid compositions of this invention are useful in the manufacture of crosslinked foams, coatings and elastomers. By way of example, the liquid phosphazene composition is normally mixed with a foaming agent (e.g. methylene chloride), a foaming catalyst (e.g. a peroxide catalyst such as benzoyl peroxide) as well as other optional ingredients such as catalyst activators (e.g. N,N-dimethylaniline), surfactants, reinforcing agents and the like. The composition will then foam at ambient temperature.

The present invention will be still further apparent from the following examples. These examples are intended merely to illustrate the practice of this invention and are not intended to limit the same.

Preparation of Solid, Linear, Diallylamino-Butoxy Substituted Phosphazene Polymer A five-liter, four-necked round bottom flask was fitted with a heating mantle, a mechanical stirrer, an addition funnel, a condenser and a thermometer. A mixture of linear PNCl$_2$ polymer (174 g, 1.5 moles having a viscosity average molecular weight of approximately 63,000) dissolved in one liter of toluene was charged to the flask and stirred along with 1250 ml of toluene. Diallylamine (61.1 g, 0.63 moles) was slowly added to the flask from an addition funnel over a period of 2 hours. During the initial stages of introduction of diallylamine, nitrogen gas was swept across the liquid surface. This mixture was then stirred at 80° C. for 10 hours. The resulting mixture was cooled to room temperature and the partially substituted phosphonitrilic chloride polymer was separated from the diallylamine hydrochloride by-product by filtration and subsequent washing with fresh toluene. About 40 g (0.30 mole) of the diallylamine:HCl salt were obtained which indicated 10 mole percent of chloride groups in $(PNCl_2)_n$ were replaced with diallylamino groups. The filtrate was stored in a sealed container.

The sodium salt of n-butanol was then prepared in a twelve-liter, four-necked round bottom flask equipped with a mechanical stirrer, a condenser, an addition funnel and a thermometer. Sodium (66 g, 2.87 g-atom) and toluene (3 liters) were heated to 95°-100° C. in round bottomed flask with continuous stirring. When the sodium melted into fine droplets, (229.4 g, 3.10 moles) n-butanol was added over a period of 3 hours. The mixture was stirred at 100° C. for an additional hour and then cooled to 80° C.

At this point, the partially substituted phosphonitrilic chloride polymer filtrate was added over a period of 1 hour into the reaction flask containing the sodium butoxide. This reaction mixture was kept at temperatures of about 100°-105° C. with stirring over a 24 hour period. The resulting reaction mixture was cooled to room temperature and added into a large volume of methanol. The precipitated crude diallylamino-butoxy substituted polymer was isolated from the methanol-toluene mixed solvent and dispersed in tetrahydrofuran (THF) by stirring. The dispersion was then added into a large volume of water to remove sodium salt formed during the substitution reaction. The substituted polymer was washed with water to remove any remaining salt from the polymer. The polymer was redissolved in THF and added into methanol to precipitate the polymer. The paste-like material was dried in a vacuum oven to yield approximately 250 g of a solid, rubber-like, polymer which was amber in color.

A subsequent proton NMR analysis of this prepolymer indicated a relative mole percent of the two substituents to be as follows:
10.0 mole percent of diallylamino substituent
90.0 mole percent of n-butoxy substituent
The intrinsic viscosity of the prepolymer in THF at 25° C. was found to be 0.50.

EXAMPLE 1

The rubbery prepolymer prepared above (40 g, 100 parts) was admixed with about 6 g of tetrahydrofuran (THF) and then with trimethylolethane tri[3-mercaptopropionate] (8 g, 20 parts). The THF was then removed by vacuum distillation at about 30°-40° C. The resulting combination was subjected to a viscosity measurement in a Brookfield Viscometer and was found to have a viscosity of 135,000 cps at 23° C. Admixing tri-butylphosphate (8 g, 20 parts) to this combination reduced the viscosity to 34,000 cps at 23° C.

EXAMPLE 2

In this instance the procedure of Example 1 was followed except that ethylene dimethacrylate (12 g, 30 parts) was admixed into the prepolymer-THF composition. After removal of THF the viscosity of the combination was 475,000 cps at 23° C. Tris(2-chloroethyl)-phosphate (8 g, 20 parts) admixed with this combination lowered the viscosity to 300,000 cps at 23° C.

Preparation of a Crosslinked Foam

A 12 percent diallylamino, 88 percent butoxy substituted phosphazene polymer having an intrinsic viscosity (I.V.) of 0.5 was made liquid following the procedure outlined in Example 1. To the liquid composition containing 20 phr of pentaerythritol tetra(3-mercaptopropionate) was mixed with 5 parts of 1,1,1-trimethylol propane trimethacrylate, 15 parts of dichloroacetic acid, 25 parts of methylene chloride and 1 part of L-540 ® surfactant (a silicone surfactant manufactured by the Union Carbide Company) at room temperature with a high speed blender. To the mixed composition was added 5 parts of Lucel-4 ® (2-tert-butylazo-2-hydroxybutane) and 3 parts of tert-butylperoxybenzoate. The mixture was stirred for 30 seconds with a high speed blender after which time the foam was allowed to rise for four minutes. The foam was then post-cured in an oven at 120° C. for 3 hours. The resulting foam was resilient and non-tacky.

What is claimed is:

1. In combination,
   (i) a normally solid or viscous linear, substituted, crosslinkable phosphazene polymer having a viscosity of greater than 500,000 cps at 23° C., said polymer containing crosslinkable unsaturation in some of the substituents attached to the phosphorus atoms of said polymer, in admixture with
   (ii) from about 1 to about 30 parts per 100 parts of polymer of a curing agent selected from the group consisting of a polythiol, a polyacrylate, a polymethacrylate and mixtures thereof such that the combination has a viscosity of less than 500,000 cps at 23° C.

2. A combination of claim 1 wherein said curing agent is a polythiol.

3. A combination of claim 2 wherein said polythiol is a dithiol, trithiol, tetrathiol or a mixture thereof.

4. A combination of claim 1 wherein said curing agent is a polyacrylate, a polymethacrylate or a mixture thereof.

5. A combination of claim 1 further containing up to about 25 parts per hundred parts of polymer of an auxiliary viscosity depressing agent.

6. A process for the preparation of a liquid, crosslinkable phosphazene combination which comprises,
   (i) admixing a normally solid or viscous linear, substituted, crosslinkable phosphazene polymer having a viscosity of greater than 500,000 cps at 23° C., said polymer containing crosslinkable unsaturation in some of the substituents attached to the phosphorus atoms of said polymer, with an inert, low boiling, low molecular weight, organic solvent in an amount such that the viscosity of the resulting solution is less than about 500,000 cps at 23° C.
   (ii) admixing said solution with from about 1 to about 30 parts per hundred parts of polymer of a curing agent selected from the group consisting of a polythiol, a polyacrylate, a polymethacrylate and mixtures thereof; and then
   (iii) removing said solvent, the resulting combination having a viscosity of less than 500,000 cps at 23° C.

7. A process of claim 6 wherein in (i) from about 10 to about 100 parts per hundred parts of polymer of said solvent is admixed with said polymer.

8. A process of claim 6 wherein in (i) from about 10 to about 50 parts per hundred parts of polymer of said solvent is admixed with said polymer.

9. A process of claim 6 wherein the viscosity of the solution of (i) is less than 200,000 cps at 23° C.

10. A process of claim 6 wherein said solvent is tetrahydrofuran.

11. A process of claim 6 wherein said curing agent is a polythiol.

12. A process of claim 11 wherein said polythiol is a dithiol, trithiol, tetrathiol or a mixture thereof.

13. A process of claim 6 wherein said curing agent is a polyacrylate, a polymethacrylate or a mixture thereof.

14. A process of claim 13 wherein said polyacrylate or polymethacrylate is a difunctional, trifunctional or tetrafunctional acrylate or methacrylate, or a mixture thereof.

15. A process of claim 6 further characterized by admixing with said resulting combination from (iii) up to about 25 parts per hundred parts of polymer of an auxiliary viscosity depressing agent.

* * * * *